Oct. 24, 1967  C. F. CROWNOVER ET AL  3,349,020
LOW TEMPERATURE ELECTROPHORETIC LIQUIFIED GAS SEPARATION
Filed Jan. 8, 1964
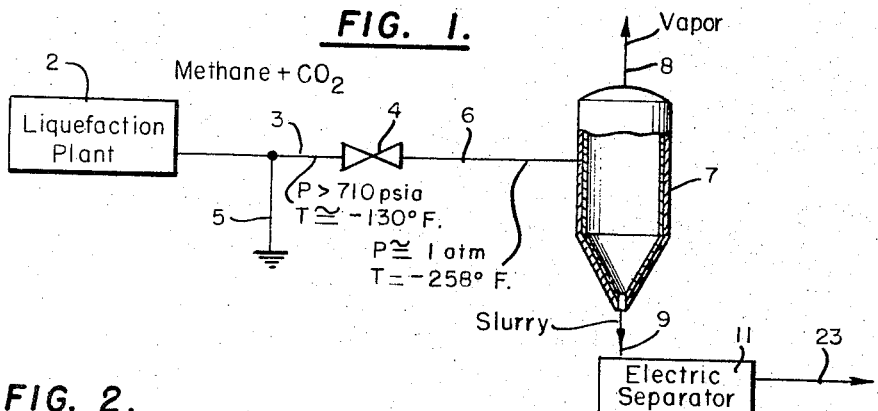
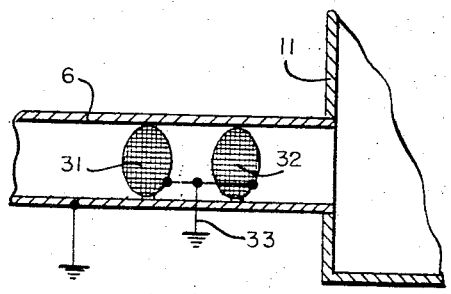
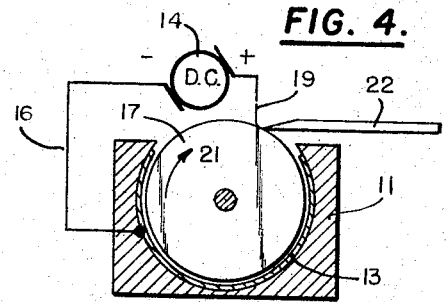
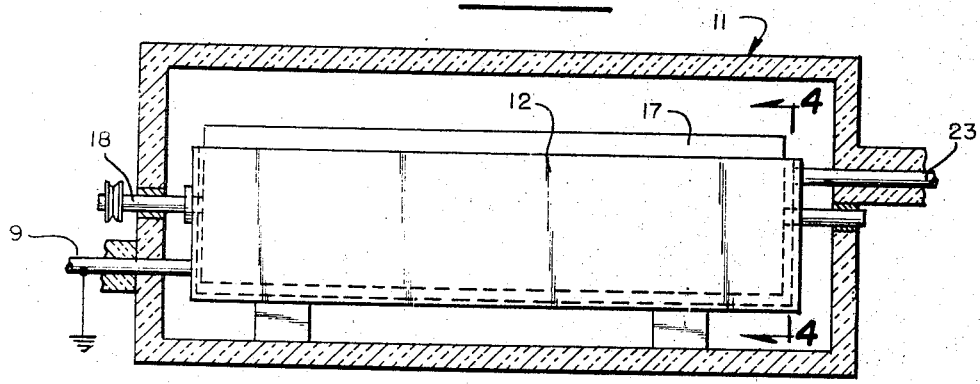
INVENTORS
Carl F. Crownover
Richard L. Every
BY  Max L. Libman
ATTORNEY

3,349,020
LOW TEMPERATURE ELECTROPHORETIC LIQUIFIED GAS SEPARATION

Carl F. Crownover and Richard L. Every, Ponca City, Okla., assignors to Conch International Methane Limited, Nassau, Bahamas, a Bahamian company
Filed Jan. 8, 1964, Ser. No. 336,590
12 Claims. (Cl. 204—180)

This invention relates to the separation of the constituents of a normally gaseous mixture of such constituents, and more particularly a normally gaseous mixture which has been converted into the form of a liquid mixture under considerable pressure. A major aspect of the invention relates particularly to the separation of impurities such as $CO_2$, $H_2S$, and so forth from natural methane gas in which such constituents exist as relatively minor impurities.

The prior art discloses a method of separating such constituents, and particularly $CO_2$ from methane gas, which includes the steps of reducing the constituent gases to a totally liquid phase under high pressure, e.g., 750 p.s.i., and at a temperature sufficiently low so that both constituents are in totally liquid form; the pressure is then reduced by means of an expansion valve or expansion engine to a point where the mixture exists as a solid phase of $CO_2$, a liquid phase of methane and the vapor phase of methane. This last mixture is then passed through a cyclone separator and the solid $CO_2$ removed as a slurry of $CO_2$ in liquid methane, the other components being suitably separated also. In practical applications, a disadvantage of the above method has appeared in that it is difficult to handle and remove the slurry of solid $CO_2$ and liquid methane, due to a tendency of the $CO_2$ particles in the slurry to agglomerate and clog up, which makes the handling of this material rather difficult. The present invention not only obviates the above difficulty as will be explained in more detail below, but also provides for the separation of the solid constituents from such a liquid-solid mixture in the manner which tends inherently to reduce the clogging effect and to make the mixture more manageable up to the point where the actual separation occurs, at which point the solid constituent is removed substantially completely from the liquid constituent.

In accordance wtih the invention, the gaseous components are produced, as before, at high pressure and low temperature, and the temperature then further reduced by reducing the pressure, to produce a solid phase of the minor constituent mixed with a liquid phase of the major constituent, and treated in such a manner as to electrically charge the particles of the solid constituent with a charge of suitable polarity (usually negative), which has two effects: (1) the particles now tend to repel each other, which reduces the clogging tendency and (2), the particles can now be suitably treated to electrically separate them out of the liquid. Therefore, up to the point of electrical separation, the mixture of solid particles and liquid does not tend to clog as previously, and remains manageable and free-flowing.

The specific nature of the invention as well as other objects and advantages thereof will clearly appear from a preferred embodiment as shown in the accompanying drawing, in which:

FIG. 1 is a diagrammatic view of an apparatus for performing the invention;

FIG. 2 is a sectional diagrammatic view of an alternative means for charging the solid particles;

FIG. 3 is a side elevational view showing the principle of an apparatus for continuously separating the solid constituent from the liquid constituent; and FIG. 4 is an end view of the apparatus shown in FIG. 3.

The invention will be described particularly with respect to the separation of $CO_2$ from natural methane gas as obtained from the well; however, it will be understood that the invention is also applicable to the separation of other gas impurities from other main gaseous materials, for example, $H_2S$-LNG slurries, $CO_2$-liquid air, $CO_2$-liquid nitrogen, and so forth. The invention is of particular interest in connection with the production of liquid natural gas (LNG), the major constituent of which is methane, from which it is often desired to remove naturally occurring $CO_2$ as an impurity. In a typical application, the gas mixture is produced in a liquifaction plant indicated at 2, and is available in pipeline 3 at a pressure above 700 p.s.i.a., and at a temperature in the order of $-130$ degrees F. At this pressure and temperature, assuming approximately 5% $CO_2$ and substantially all of the rest to be methane gas, a mixture will be in a completely liquid phase in pipeline 3. The mixture is then passed through a throttle or expansion engine 4 in such manner as to reduce its temperature to $-258$ degrees F. at a pressure of 1 atmosphere. Under these conditions, there will exist in pipeline 6 a single liquid phase of methane, a vapor phase of methane, and a solid phase of $CO_2$, comprising substantially all of the $CO_2$ in the mixture. A small amount of $CO_2$ will remain dissolved in the liquid and vapor, but this is so small as to be negligible. The effect of the throttling or expansion step in converting the material from the totally liquid phase in pipeline 3 to the above conditions in pipeline 6 is to produce a high degree of turbulence, and one resultant effect of this is to charge electrically a high percentage of the solid $CO_2$ particles with a charge of negative polarity. This effect is enhanced by grounding the pipeline 3 and 6 as shown at 5, so that the frictional effect of the liquid flow along the pipelines also tends to produce a static charge in the liquid, which charge becomes associated with the $CO_2$ particles as soon as they are formed. In many cases, this charge is sufficient for the purpose of the electrical separation step to be described, but it is also possible to enhance the effect by deliberately increasing the grounding effect as will be described below.

The slurry in line 6 now has less tendency to coagulate than an uncharged slurry, due to the individual particles having a like charge and tending to repel each other. This slurry is now passed into a vapor separator 7, and the vapor constituent removed on pipeline 8, while the slurry is removed on line 9, and immediately conducted to electrostatic separator 11, shown in more detail in FIGS. 3 and 4. It will be noted that no effort is made to draw off clear liquid as was done in the prior art, and to separately remove a thickened slurry from the separator, in consequence of which the very thin slurry containing the charged particles of solid $CO_2$ readily passes down pipeline 9 to the electric separator.

One form of continuous separator is shown in FIGS. 3 and 4, where the above slurry passes the pipe 9 to a cylindrical chamber 12 lined with a conducting material, e.g., copper screen, as shown at 13, this conductive lining being charged to a high negative polarity from D.-C. generator 14 via line 16. As an upper limit, the electric field strength between the conductive linings is maintained at a value not exceeding the breakdown potential of the slurry being processed (e.g., LNG≈30,000 volts per cm.). A drum 17 is located centrally within the cylindrical chamber 13, and is continuously revolved by means of a drive shaft 18, driven from any suitable motor. The surface of the drum is also electrically conducting, and may be in fact a cylindrical sheet of copper firmly fixed to the surface. The positive side of D.-C. generator 14 is electrically connected to this surface near line 19. The drum rotating in the direction indicated by arrow 21, is engaged by the sharp knife-edge of a scraper 22, which is stationary. It will be apparent that the high electric voltage will produce a field causing the negatively charged particles of solid $CO_2$ to migrate toward and become attached to the conductive surface of drum 17, and to be carried thereby until the material is scraped off by scraper 22, after which it can be continuously removed from this point by any suitable conveying means. This action very rapidly and very completely removes the solid $CO_2$ particles from the liquid methane, leaving clear liquid methane which can be removed via overflow 23. The $CO_2$ thus produced may be used as a commercial product, or many be further employed in heat exchange relationship with incoming LNG at any suitable stage of the flowline, in order to improve the thermal efficiency of the process. It will, of course, not be in the form of dry $CO_2$ since it is removed from the liquid (but will contain a certain amount of acompanying liquid, and therefore will be in the form of a thick slurry having a considerable constituent of liquid methane, which may also be suitably employed for heat transfer purposes, and the resulting gaseous methane component may then be employed as a fuel at a suitable stage of the liquefaction or any other process. The liquid emerging from pipe 23 is quite clear liquid methane, with only a negligible percentage of dissolved $CO_2$.

Referring to FIG. 2, instead of expanding the totally liquid phase in line 3 to the above-described multiple phase in line 6, it can also be changed, as by cooling it down from an external refrigeration source, to a phase consisting of liquid methane gas, and solid $CO_2$ particles, with no vapor phase present. It will be understood that the degree of cooling required for this will vary with the percentage of $CO_2$, and the initial conditions of the material in line 3, but can be easily determined from the pressure-temperature diagram for the materials. Since the resulting liquid-solid mixture in line 6 does not include the vapor phase, it is not subject to the same degree of turbulence, and it is therefore desirable to enhance the frictional charging effect. An apparatus for doing this is shown in FIG. 2, and consists of two screen sections 31 and 32, which are supported within pipeline 6, and are carefully grounded, as indicated at 33, to insure intimate contact and more effective charging. In practice, a sufficient number of charge screens will be included to adequately charge the solid $CO_2$ particles. In this case, it is not necessary to use the separator 7, and the liquid solid mixture in line 6 is passed directly, and by as short a connection as possible, to electric separator 11, for treatment as above described.

It will be apparent that the embodiments shown are only exemplary and that various modifications can be made in construction and arrangement within the scope of our invention as defined in the appended claims.

We claim:

1. A process for the separation of mixtures including two different gases, one of which solidifies at a higher temperature than the other, which comprises the step of cooling the mixture until a slurry is produced wherein one of said two constituents is in a liquid phase and the other is in a solid phase, charging the solid phase particles of said slurry with a charge of a single polarity, and separating said charged particles from the liquid by attracting them to an electrode of opposite polarity to that of the charged particles in a high voltage D.C. field.

2. The invention according to claim 1, both the liquid and the solid constituents of said slurry being non-conductors.

3. The invention acording to claim 2, the said two constituents being liquid methane and $CO_2$.

4. The invention according to claim 3, said two constituents being initially under high pressure and at a low temperature, said cooling step being accomplished by reducing said high pressure.

5. The invention according to claim 4, said reduction in pressure being such as to turbulently produce a liquid and a vapor phase of the methane and a solid phase of the $CO_2$, said turbulence tending to produce a negative electric charge on the $CO_2$ particles of the slurry.

6. The invention according to claim 5, including the further step of separating the vapor phase of methane from the mixture leaving a flowable slurry of liquid methane and $CO_2$.

7. The invention according to claim 6, including the step of grounding positive charges produced in the slurry.

8. The invention according to claim 1, said separation step comprising the step of passing the charged slurry into a cylindrical chamber containing a drum concentric therewith and insulatingly spaced therefrom, applying a high D.-C. voltage between said drum and said chamber of such polarity as to cause the charged particles of the slurry to migrate to the surface of the drum rotating said drum and scraping the adhered solid material from the drum.

9. The invention according to claim 3, said two constituents being methane and $H_2S$.

10. The invention according to claim 3, said two constituents being LNG and $H_2S$.

11. The invention according to claim 3, said two constituents being $CO_2$ and liquid air.

12. The invention according to claim 3, said two constituents being $CO_2$ and liquid nitrogen.

References Cited
UNITED STATES PATENTS

| | | | |
|---|---|---|---|
| 2,485,335 | 10/1949 | Tyson | 204—180 |
| 2,900,797 | 8/1959 | Kurata et al. | 62—12 |
| 3,129,157 | 4/1964 | Loeckenhoff | 204—180 |

JOHN H. MACK, *Primary Examiner.*

A. PRESCOTT, *Assistant Examiner.*